(12) United States Patent
Schilling et al.

(10) Patent No.: US 7,618,564 B2
(45) Date of Patent: Nov. 17, 2009

(54) MICROSTRUCTURE AND METHOD FOR PRODUCING MICROSTRUCTURES

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 754 days.

(21) Appl. No.: 10/555,422

(22) PCT Filed: Mar. 18, 2004

(86) PCT No.: PCT/EP2004/002822

§ 371 (c)(1),
(2), (4) Date: Oct. 21, 2005

(87) PCT Pub. No.: WO2004/083911

PCT Pub. Date: Sep. 30, 2004

(65) Prior Publication Data

US 2007/0003876 A1 Jan. 4, 2007
US 2008/0102408 A9 May 1, 2008

(30) Foreign Application Priority Data

Mar. 21, 2003 (DE) ................. 103 12 564
Apr. 22, 2003 (DE) ................. 103 18 105

(51) Int. Cl.
*B29D 11/00* (2006.01)

(52) U.S. Cl. ................. 264/1.31; 264/1.37; 264/2.7

(58) Field of Classification Search ................. 264/1.1, 264/1.31, 2.7, 1.37
See application file for complete search history.

(56) References Cited

U.S. PATENT DOCUMENTS 4,402,571 A * 9/1983 Cowan et al. .......... 204/192.26

(Continued)

FOREIGN PATENT DOCUMENTS

DE 100 28 426 A1 4/2001

(Continued)

OTHER PUBLICATIONS

Bryngdahl, "Moire and Higher Grating Harmonics," Journal of the Optical Society of America, vol. 65, No. 6, pp. 685-694 (Jun. 1975).

(Continued)

*Primary Examiner*—Mathieu D. Vargot
(74) *Attorney, Agent, or Firm*—Hoffmann & Baron, LLP

(57) ABSTRACT

Light-diffracting microstructures are produced by the superimposition of at least two relief structures, wherein the first relief structure is produced mechanically while at least one second relief structure is a photomechanically generated diffraction structure.

A process for the production of light-diffracting microstructures which are additive superimpositions comprising a relief structure and at least one diffraction structure, is distinguished by the following steps:

a) producing a layer of photoresist on a substrate whose free surface has the relief structure,
b) producing an interference pattern with coherent light over the relief structure,
c) orienting the relief structure in relation to the interference pattern,
d) exposing the relief structure by means of the interference pattern,
e) developing the photoresist, wherein material of the photoresist which is changed by the exposure operation is removed and recesses, for example grooves, of the diffraction structure are produced on the relief structure, and
f) drying the photoresist.

15 Claims, 2 Drawing Sheets

U.S. PATENT DOCUMENTS

| | | |
|---|---|---|
| 4,537,504 A | 8/1985 | Baltes et al. |
| 4,933,120 A | 6/1990 | D'Amato et al. |
| 5,116,548 A | 5/1992 | Mallik et al. |
| 5,138,604 A | 8/1992 | Umeda et al. |
| 5,575,878 A | 11/1996 | Cox et al. |
| 5,995,638 A | 11/1999 | Amidror et al. |
| 6,027,595 A | 2/2000 | Suleski |
| 6,043,936 A | 3/2000 | Large |
| 6,359,735 B1 | 3/2002 | Gombert et al. |

FOREIGN PATENT DOCUMENTS

| | | |
|---|---|---|
| EP | 0105099 B1 | 4/1984 |
| GB | 2027441 | 2/1980 |
| JP | 08-137375 * | 5/1996 |
| JP | 2000264000 | 9/2000 |
| RU | 2084010 | 7/1997 |
| WO | WO9721121 | 6/1997 |
| WO | WO 00/61386 | 10/2000 |
| WO | WO0210803 | 2/2002 |
| WO | WO 02/48760 | 6/2002 |
| WO | WO 03/084764 | 10/2003 |

OTHER PUBLICATIONS

Jonsson, et al., "Investigation of Optical Properties of Injection Moulded Subwavelength Gratings," Proceedings of SPIE, vol. 4779, pp. 23-29 (2002).

* cited by examiner

MICROSTRUCTURE AND METHOD FOR PRODUCING MICROSTRUCTURES

CROSS-REFERENCE TO RELATED APPLICATIONS

This application is a National Phase application of international Application No. PCT/EP2004/002822 filed Mar. 18, 2004, which claims priority based on German Patent Applicaton No. 103 12 564.7, filed Mar. 21, 2003 and German Patent Application No. 103 18 105.9, filed Apr. 22, 2003, which are all incorporated herein by reference.

BACKGROUND OF THE INVENTION

The invention relates to a process for the production of microstructures which are formed by the superimposition of a relief structure with at least one second relief structure.

Light-diffracting microstructures have a plurality of recesses which are generally in the form of parallel grooves and which for example form an optical grating with a microscopically fine relief structure. Light which is incident on the microstructures is diffracted or scattered in a manner which is predetermined by the microstructure. Mosaics consisting of the microstructures are shaped for example in plastic material or metal and serve as authenticity features for valuable articles. Those authenticity features exhibit a striking optical behaviour and are difficult to imitate.

Some processes are known for the production of microstructures of that kind. Thus mechanical apparatuses produce the microstructures by scratching many parallel grooves in a substrate surface. The shape of the scratching tool determines the profile of the relief structure. The operation of scratching the relief structure becomes progressively more difficult and consequently expensive, with an increasing number of lines per millimeter. Holographic processes are less expensive, wherein two coherent light beams from a laser light source are caused to interfere on a photosensitive layer of photoresist. The interference image with its light and dark fringes expose the photoresist in accordance with the local level of light intensity. After development the surface of the photoresist has a relief structure of a symmetrical profile. In a further process an electron beam draws the relief structure groove by groove in the layer of photoresist, in which case the grooves can also form curved lines. The microstructure master shapes produced in accordance with those processes can be replicated galvanically and with the copies produce metallic stamping punches with which the shape of the microstructures can be produced in metal or plastic material. With those processes however the apparatus expenditure for the production of microstructures is extremely high.

It is also known from EP-A 0 105 099 for new microstructures to be synthesised in the form of a mosaic, in which case one out of a set of different relief structures, oriented in a predetermined manner in the azimuth, is mechanically shaped in each surface element of the mosaic.

U.S. Pat. No. 5,138,604 discloses a recording means whose first macroscopic relief structure is superimposed with a second diffractive structure. The first relief structure is registered by means of exposure through a mask in an unexposed photoresist layer. The exposed photoresist layer is then exposed again, in which case the interference pattern of a hologram acts on the photoresist layer. After development of the photoresist layer, the first relief structure corresponding to the mask structure remains on the substrate of the photoresist layer, the backs of the first relief structure having the diffractive structure of the hologram.

WO 00/61386 describes the production of a decorative film. Macroscopic structures are shaped into the surface of a film by means of a stamping punch. If, instead of smooth punch surfaces, such punch surfaces which are provided with a microscopically fine structure are used for the shaping operation, the macroscopic structures shaped into the film have the microscopically fine structures.

A method is described in JP 2000 264000 for the production of a diffractive structure which is superimposed with an additional structure. That method uses the change in length of a resin which hardens by radiation, if it is heated greatly during the hardening process. A diffractive relief is firstly shaped into the semi-hardened layer of the resin and a reflection layer is applied to the surface which is deformed with the relief. Due to heating of the resin, the change in length causes additional deformation of the surface in the form of wrinkles. Those wrinkles are also superimposed on the relief. Further hardening of the resin fixes the relief with the superimposed wrinkle structure.

U.S. Pat. No. 4,537,504 discloses a diffractive structure which is shaped on a corrugated surface, the period of the corrugations of the surface being much greater than the period of the diffractive structure.

U.S. Pat. No. 6,043,936 describes two methods of producing the casting mold for shaping diffractive step pyramids. A first method is the above-described, purely mechanical removal method and the second method uses an anisotropic etching method in silicon for producing the pyramid shape. The smooth pyramid surfaces then receive a coating of photoresist. The photoresist layer is exposed under the action of an electron beam in such a way that, after development of the photoresist layer, the pyramid surfaces have steps. The shapes of the diffractive step pyramids are produced galvanically, for the production of punch dies.

The subject-matter of WO 03/084764 concerns a security element which is difficult to copy, enclosed in a layer composite. The diffractive structures of the security element are additively superimposed with a macroscopic superimposition function, wherein the superimposition functions change slowly in comparison with the diffractive structures.

SUMMARY OF THE INVENTION

The object of the invention is to propose an inexpensive process for the production of a microstructure whose relief structure is produced by a superimposition of at least two relief structures, so that a microstructure, for example for a replication master, which is relatively easy to produce with a high degree of accuracy and which is complicated and consequently difficult to imitate is formed.

According to the invention the specified object is attained by the features recited in claim 1 and is based on the idea of combining a stamping or other mechanical shaping process with a photostructuring in order to produce microstructures which are inexpensive but nonetheless complicated. Advantageous configurations of the invention are set forth in the further claims.

BRIEF DESCRIPTION OF THE DRAWINGS

An embodiment of the invention is described in greater detail hereinafter and illustrated in the drawing in which.

DETAILED DESCRIPTION OF THE INVENTION

Figure 1:
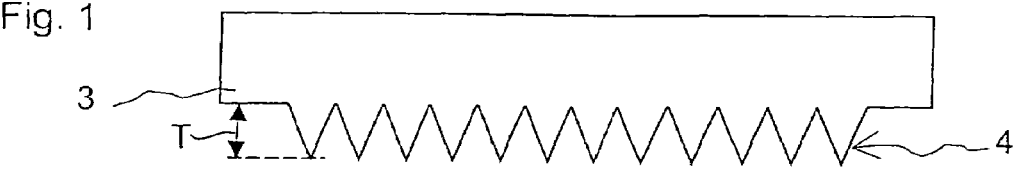
FIG. 1 shows a substrate with a layer of photoresist.

Referring to FIG. 1, shown therein in cross-section is a first step for the production of optically diffractive structures. A layer 2 of photoresist is applied to a flat substrate 1 of metal, glass, ceramic or plastic material. The thickness d of the layer 2 is in the region of between 0.1 µm and 100 µm and depends on the depth of the diffractive structures to be produced. Photosensitive photoresist materials are known, for example from Shipley, the product Microposit S 1813. The photoresist material is applied to the substrate 1 in liquid form and solidified under the effect of heat. In a preferred variant a relief die 4 mounted on a stamping punch 3 is lowered into the flat free surface of the layer 2 and impressed into the free surface of the layer 2 so that the shape of the relief die 4 is produced in the free surface of the layer 2.

Figure 2:
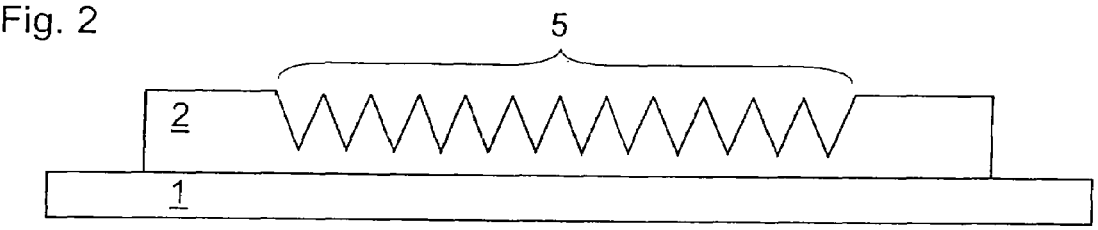
FIG. 2 shows the stamped surface of the layer of photoresist.

As shown in FIG. 2, after the stamping punch 3 (FIG. 1) is lifted off, the layer 2, in the region of the stamping punch, has a relief structure 5 which is a negative of the relief die 4 (FIG. 1). The substrate 1 is not to deform or flex during the stamping operation so that the relief die 4 transfers the relief structure 5 on to the layer 2 with the utmost fidelity in respect of shape.

Without restricting the meaning of the term 'relief structure' 5, FIG. 1 of the drawing shows the profile of the relief die 4, the shape of which is to be formed in the substrate, by way of example with a symmetrical sawtooth profile of a periodic grating. In particular also one of the other known profiles such as for example asymmetrical sawtooth profiles, rectangular profiles, sinusoidal or sine-like profiles, a regular arrangement of pyramids and so forth which form a periodic linear grating or cross grating are suitable for the relief structure 5. The spatial frequency of the relief structure 5 can be selected from the wide range of between 1 line/mm to some 1000 lines/mm. The structural depth T of the relief structure 5 of a periodic grating is usually in the region of between 0.1 µm and 100 µm, in which respect, for technical reasons, relief structures 5 of a great structural depth T (FIG. 1) typically have a low value in respect of the spatial frequency.

In another variant of the process an isotropic or anisotropic matt structure which forms the relief structure is shaped into the surface of the layer 2. The matt structures include microscopically fine relief structural elements which determine the scatter capability and which can only be described with statistical parameters such as for example mean roughness value $R_a$, correlation length $I_c$ and so forth, the values in respect of the mean roughness value $R_a$ being in the region of between 20 nm and 2500 nm, with preferred values of between 50 nm and 500 nm. At least in one direction the correlation length $I_c$ is of values in the region of between 200 nm and 50,000 nm, preferably between 1000 nm and 10,000 nm. The microscopically fine relief structural elements of the isotropic matt structure do not have an azimuthal preferred direction, for which reason the scattered light of an intensity which is greater than a limit value which is predetermined for example by visual perceptibility, is distributed uniformly in a spatial angle predetermined by the scatter capability of the matt structure, in all azimuthal directions. Strongly scattering matt structures distribute the scattered light into a larger spatial angle than a weakly scattering matt structure.

If in contrast the microscopically fine relief structural elements have a preferred direction in the azimuth, the matt structure scatters incident light anisotropically. The spatial angle which is predetermined by the scatter capability of the matt structure is of a cross-sectional shape in the form of an ellipse whose long major axis is perpendicular to the preferred direction of the relief structural elements. In contrast to the diffractive structures the matt structures scatter the incident light practically independently of the wavelength thereof, that is to say the color of the scattered light substantially corresponds to that of the light which is incident on the matt structures.

Figure 3:
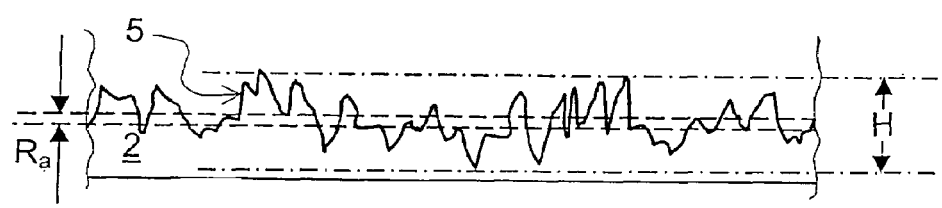
FIG. 3 shows a matt structure.

FIG. 3 shows a cross-section by way of example through one of the matt structures, the shape of which is produced in the layer 2 as a relief structure 5. Instead of the structural depth T (FIG. 1) of the gratings the profile of the matt structure has the mean roughness value $R_a$. The fine relief structural elements of the matt structure exhibit greatest differences in height H up to about 10 times the mean roughness value $R_a$. The greatest differences in height H of the matt structure therefore correspond to the structural depth T for the periodic gratings. The values of the differences in height H of the matt structures are in the above-indicated range of the structural depth T. The details set out hereinafter in respect of the range of the structural depth T therefore apply both to relief structures 5 with periodic gratings and also relief structures 5 with matt structures.

Figure 4:
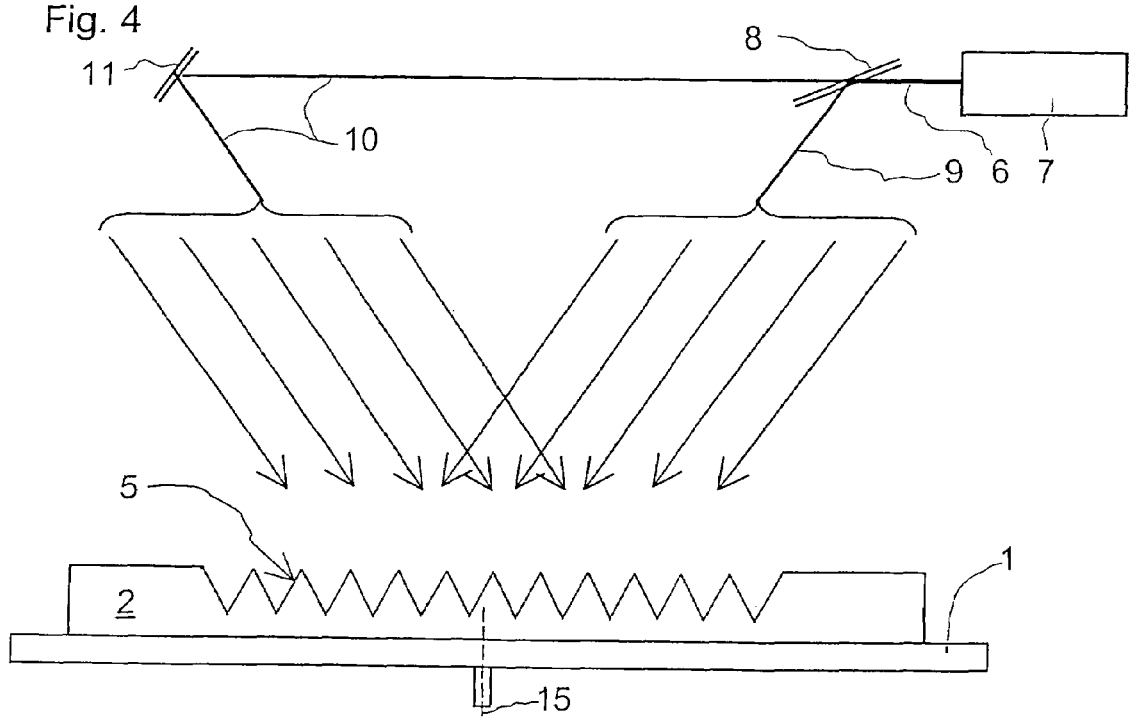
FIG. 4 shows the operation of exposing the photoresist.

Reference is now made to FIG. 4 to describe a holographic process which, by means of photostructuring of the relief structure 5, additively superimposes a diffraction grating (not shown in FIG. 4). A coherent light beam 6 of a wavelength of for example 400 nm is produced in a laser light source 7. The light beam 6 impinges on a beam splitter 8. The beam splitter 8 deflects a part of the light beam 6 in the direction of the relief structure 5, as a partial beam 9. The rest of the light which passes undeflected through the beam splitter 8 forms a reference beam 10. A deflection mirror 11 also directs the reference beam 10 on to the relief structure 5. The partial beam 9 and the reference beam 10 are fanned out in such a way that each of the beams 9, 10 would individually illuminate the entire relief structure 5 with parallel light beams. The direction of the partial beam 9 differs from the direction of the reference beam 10 so that the partial beam 9 and the reference beam 10 intersect at a predetermined intersection angle in the region of the structured surface. Because of the coherence of the light waves and the wavelength difference of the two beams 9, 10, the partial beam 9 and the reference beam 10 interfere with each other in such a way that an interference pattern is produced on the relief structure 5. The interference pattern includes parallel fringes of a high level of light intensity which are separated by fringes of a low level of light intensity, wherein the fringes of the interference pattern perpendicularly intersect the track of a plane defined by the partial beam 9 and the reference beam 10, on the relief structure 5. The number of fringes per millimeter is determined by the wavelength of the light forming the beams 6, 9, 10 and by the intersection angle at which the partial beam 9 and the reference beam 10 intersect.

By virtue of rotation of the substrate 1 about a normal 15 to the plane of the substrate 1, the substrate 1 and therewith the relief structure 5 are oriented in respect of azimuth with the interference pattern prior to the exposure operation and a predetermined azimuth value is set.

The material of the above-mentioned photoresist is altered by exposure with the interference pattern only in the fringes involving the high level of light intensity, in such a way that, after exposure, the material of the photoresist is dissolved under the effect of the developer, for example Shipley Mikroposit 351. In that case, recesses are produced in the surface of the photoresist, in the form of parallel grooves of a diffraction grating whose grating period is equal to the spacing of the fringes in the interference pattern. The grating period is adjustable insofar as the intersection angle at which the partial beam 9 and the reference beam 10 intersect is changed. The wavelength of the light beam 6 is predetermined by the laser light source and must be suitable for exposure of the photoresist of the layer 2.

The profile of the grooves and the geometrical profile depth t thereof are determined by the exposure time, the development time and the light intensity. The depth of the grooves reaches a predetermined value of normally 250 nm. The profile is symmetrical and extends from a simple sine profile to a rectangular profile. The position of the grooves is determined by the fringes of the interference pattern. Therefore the grating lines of the relief structure 5 and the grooves of the diffraction structure differ in respect of azimuth by the set predetermined azimuth value.

Figure 5:
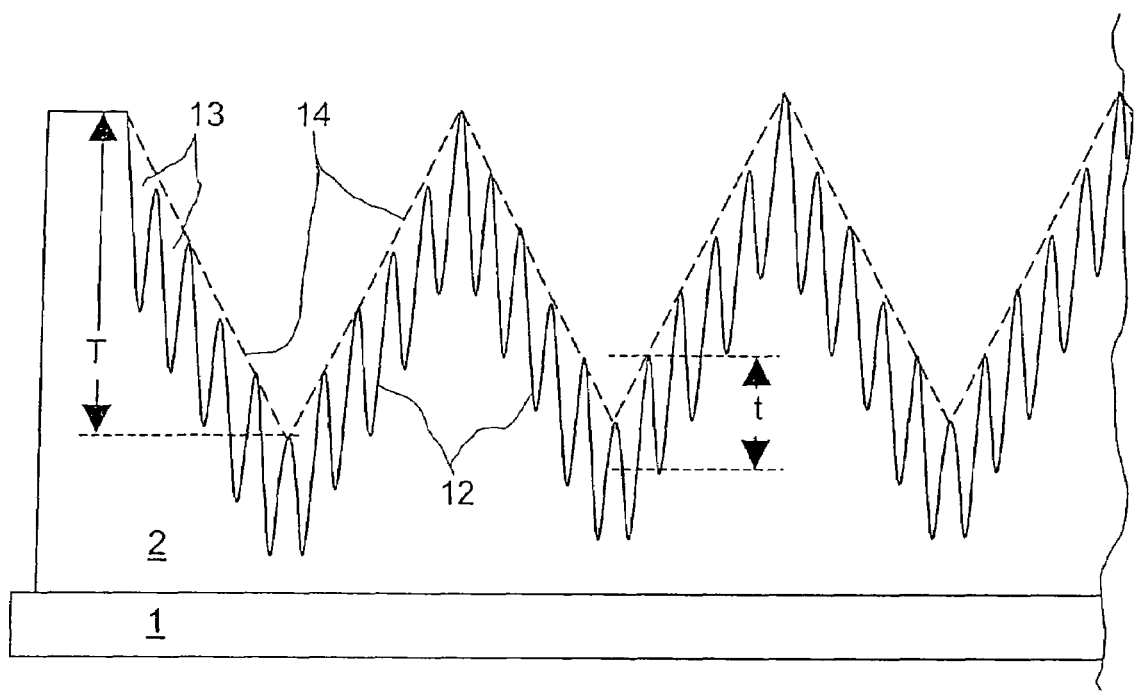
FIG. 5 shows a profile of a microrelief.

FIG. 5 shows the surface of the layer 2 after photostructuring of the relief structure 5 (FIG. 4). A microstructure 12 has been produced in the surface of the layer 2, which is produced by additive superimposition of the relief structure 5 with the holographically produced diffraction structure, wherein, in the example, the grating lines of the relief structure 5 and the grooves 13 of the diffraction structure involve the same azimuthal orientation. The original relief structure 5 is indicated in FIG. 5 by means of a broken line 14. The photoresist which was originally present between the broken line 14 and the microstructure 12 has been removed in the development operation.

After drying of the photoresist the shape of the microstructure 12 is galvanically produced in nickel in known manner, thus producing a master of the microstructure 12. The reflecting master is subjected to a check to ascertain whether the optical properties of the master correspond to the expected properties. That master is then used to produce copies with which portions from the master are combined in plastic material or metal with other diffraction structures, mirror surfaces and so forth, to afford a mosaic-like pattern for an optical security element.

That production process has the advantage that it is substantially ensured (and better than when using other processes) that a genuine addition of the structures to be combined, the relief structure 5 and the diffraction structure, is achieved for the microstructure 12, with the geometries of the relief structure 5 and the diffraction structure being substantially retained.

In this respect it is also possible to combine structures which differ greatly in respect of their dimension. For example the relief structure 5 can be of a structural depth T of more than 2 μm and can be one of the matt structures or one of the gratings or indeed microprisms of a retroreflector. The relief structure 5 is superimposed with the diffraction structure with a low value in respect of the grating period.

In a first process for the production of the microstructure 12, one of the above-described periodic gratings is shaped into the layer 2 in the form of a relief structure 5 which is photostructured with the diffraction structure. In a specific embodiment the spatial frequency of the diffraction structure is at least five times higher than the spatial frequency of the relief structure 5.

In a second process for production of the microstructure 12, one of the above-described matt structures is shaped into the layer 2 which is photostructured with the diffraction structure. The grating period of the diffraction structure is at most 500 nm so that light is reflected only into the zero diffraction order. The advantage of that microstructure 12 is that it combines the scatter capability of the matt structure with the properties of the diffraction grating, such as for example wavelength-selective reflection capability, polarisation capability and so forth.

The processes for production of the microstructure 12 can be enlarged in a first manner insofar as, after the previous photostructuring has been effected, the intersection angle at which the partial beam 9 (FIG. 4) and the reference beam 10 (FIG. 4) intersect is altered, and a further photostructuring operation is effected with an interference pattern whose fringe pattern is altered in respect of the number of fringes per millimeter in comparison with the previous photostructuring. That expansion of the process with a different setting in respect of the spatial frequency of the fringe pattern is effected once or repeated a plurality of times with different spatial frequency values until the predetermined microstructure 12 is reached.

The processes for production of the microstructure 12 can be enlarged in a second manner insofar as, after the previous photostructuring operation has been effected, a further photostructuring operation is effected with a different azimuthal orientation of the substrate 1 in relation to the interference pattern formed by the partial beam 9 (FIG. 4) and the reference beam 10 (FIG. 4). That expansion of the above-described photostructuring operation with a different setting in respect of the azimuthal orientation is effected once or repeated a plurality of times with different azimuthal orientations until the predetermined microstructure 12 is reached.

The processes for production of the microstructure 12 can be varied in a third manner insofar as, after the previous photostructuring operation has been effected, both the spatial frequency of the fringe pattern and also the azimuthal orientation are altered and then a further photostructuring operation is carried out. That expansion of the above-described photostructuring operation with a different setting in respect of the spatial frequency of the fringe pattern and the azimuthal orientation is effected once or repeated a plurality of times with different setting values until the predetermined microstructure 12 is reached.

In the process described as the preferred process, step a) involves using a stamping process for producing the shape of the relief structure 5. It is however also possible for the process to be altered in step a) in such a fashion that the relief structure 5 is already shaped when casting the layer 2. In that case, the liquid photoresist is poured into a casting mold comprising the substrate 1 and the relief die 4 (FIG. 1) disposed in opposite relationship to the substrate 1. The relief die 4 is removed after solidification of the photoresist under the effect of heat. The free surface of the layer 2 has the relief structure 5 as the negative of the relief die 4.

In a further variant of the process, in step a), instead of stamping or casting, the relief structure 5 can be mechanically cut into the layer 2 directly with a cutting stylus.

Figure 6:
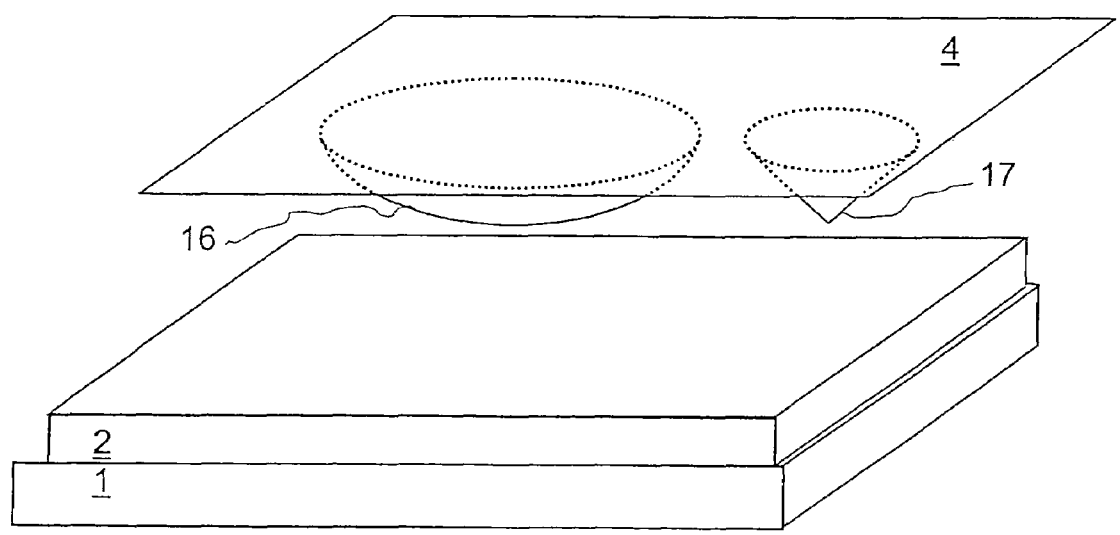
FIG. 6 shows a stamping punch with a relief die.

A variant of the process as shown in FIG. 6 uses as the relief die 4 a structure which includes at least one paraboloid surface 16 and/or cone tip 17. The paraboloid surfaces 16 and/or the cone tips 17 are also combined with the above-described periodic grating. The shape of the relief die 4 is produced in the layer 2 on the substrate 1. The photostructuring operation is then performed.

A further variant of the process for producing the microstructure 12, instead of using the grating or the matt structure as a relief die 4, uses an already existing combination structure with superimposed structures, which in the above-described process steps is firstly shaped into the surface of the layer 2 of photoresist to produce the relief structure 5, and is then further subjected to photostructuring.

It is known that, besides the above-described, positively acting photoresist, it is also possible to use a negatively acting photoresist (Futurrex NR7-1000PY) which is highly suitable for that process.

What is claimed is:

1. A process for the production of light-diffracting microstructures in a layer of photoresist on a substrate, which are produced by superimpositions of a first relief structure with at least one second relief structure serving as a diffraction structure, comprising the steps of
   a) producing a layer of photoresist with a first relief structure on a flat substrate, which is produced by forming the shape of a relief die disposed in opposite relationship to the substrate, into the free surface of the layer,
   b) removing the relief die,
   c) producing an interference pattern on the relief structure, wherein coherent light is divided into a partial beam and a reference beam and the partial beam and the reference beam are caused to interfere including a predetermined intersection angle on the shaped first relief structure,
   d) orienting the interference pattern which includes fringes of a high level of light intensity separated by fringes of a low level of light intensity in respect of azimuth in relation to the first relief structure by rotation of the substrate about a normal to the plane of the substrate,
   e) exposing the first relief structure in the photoresist layer by means of the interference pattern during a predetermined time,
   f) developing the photoresist during a predetermined time, wherein material of the photoresist which was changed during the exposure operation is partially removed and grooves of the diffraction structure are produced in the first relief structure, and
   g) drying the photoresist.

2. A process as set forth in claim 1, wherein in step f) the time for development of the photoresist is such that the grooves of the diffraction structure reach a depth of at most 500 nm.

3. A process as set forth in claim 1, wherein in step a) firstly the photoresist layer is produced on the flat substrate, solidified by the action of heat and then the relief die mounted on a stamping punch is lowered into the surface of the photoresist layer so that the shape of the first relief structure is produced as a negative of the relief die.

4. A process as set forth in claim 1, wherein in step a) the layer is produced by casting, wherein the liquid photoresist is cast between the substrate and a relief die and that after solidification of the photoresist under the effect of heat and removal from the mold the free surface of the layer has the first relief structure as a negative of the relief die.

5. A process as set forth in claim 1, wherein in step a) a periodic grating is shaped in the photoresist layer as the first relief structure.

6. A process as set forth in claim 1, wherein in step a) a cross grating is shaped in the photoresist layer as the first relief structure.

7. A process as set forth in claim 1, wherein in step a) a periodic grating is shaped in the photoresist layer with a spatial frequency in the region of between 1 line/mm and 1000 lines/mm as the first relief structure.

8. A process as set forth in claim 5, wherein in step b) the intersection angle between the partial beam and the reference beam is so set that the diffraction structure produced is a grating having a spatial frequency which corresponds at least to five times the spatial frequency of the relief structure.

9. A process as set forth in claim 1, wherein in step a) the first relief structure is shaped into a light-scattering matt structure.

10. A process as set forth in claim 1, wherein in step a) a relief die with a structure with at least one paraboloid surface and/or a cone tip is used for producing the shape of the first relief structure.

11. A process as set forth in claim 1, wherein the relief structure is shaped with a structural depth (T) in the region of between 0.1 μm and 100 μm.

12. A process as set forth in claim 1, wherein prior to execution of step g) the photostructuring is repeated with at least one further diffraction structure with the steps c) through f), wherein in step d) the first relief structure with the grooves of the diffraction structure is oriented in relation to a new interference pattern by rotation of the substrate about the normal.

13. A process as set forth in claim 1, wherein upon repetition of the photostructuring operation in step b) the intersection angle between the partial beam and the reference beam is changed.

14. A process as set forth in claim 1, wherein in step b) the intersection angle between the partial beam and the reference beam is so set that the diffraction structure is produced with a grating period of at most 500 nm.

15. A process as set forth in claim 1, wherein in step f) the time for development of the photoresist is such that the grooves of the diffraction structure reach a depth of at most 250nm.

* * * * *